(12) United States Patent
Raszkowski et al.

(10) Patent No.: US 7,002,267 B2
(45) Date of Patent: Feb. 21, 2006

(54) METHOD AND APPARATUS FOR COOLING A HYBRID TRANSMISSION ELECTRIC MOTOR

(75) Inventors: James A. Raszkowski, Indianapolis, IN (US); Edward L. Kaiser, Rochester Hills, MI (US); Anthony P. Tata, Fenton, MI (US); Kyle K. Kinsey, Fenton, MI (US); Joel E. Mowatt, Zionsville, IN (US); William S. Reed, Greenfield, IN (US); Michael D. Foster, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/060,083

(22) Filed: Feb. 17, 2005

(65) Prior Publication Data

US 2005/0206248 A1 Sep. 22, 2005

Related U.S. Application Data

(60) Provisional application No. 60/555,270, filed on Mar. 22, 2004.

(51) Int. Cl.
*H02K 9/00* (2006.01)

(52) U.S. Cl. .......................... 310/54; 310/52; 310/57; 310/89; 310/254; 180/65.4; 180/65.6; 475/5

(58) Field of Classification Search ............ 310/52–59, 310/89, 216, 254, 261; 180/65.1–65.5, 339; 475/5
See application file for complete search history.

(56) References Cited

U.S. PATENT DOCUMENTS

| | | | |
|---|---|---|---|
| 5,713,427 A * | 2/1998 | Lutz et al. ................. | 180/65.4 |
| 5,718,302 A * | 2/1998 | Hasebe et al. ............. | 180/65.6 |
| 6,258,001 B1 * | 7/2001 | Wakuta et al. .................. | 475/5 |
| 6,373,155 B1 * | 4/2002 | Shimizu et al. .......... | 310/68 B |
| 6,397,968 B1 * | 6/2002 | Sugano et al. ............. | 180/339 |
| 6,777,837 B1 * | 8/2004 | Tsuzuki et al. ........... | 310/67 R |

\* cited by examiner

*Primary Examiner*—Thanh Lam
(74) *Attorney, Agent, or Firm*—Christopher DeVries

(57) ABSTRACT

The present invention is drawn to a method and apparatus for cooling a hybrid transmission electric motor. More precisely, an annular chamber is formed between a housing for the electric motor and a transmission housing. Coolant is disposed in the annular chamber and is applied to the electric motor through a plurality of coolant apertures in the motor housing to cool the motor.

17 Claims, 5 Drawing Sheets

METHOD AND APPARATUS FOR COOLING A HYBRID TRANSMISSION ELECTRIC MOTOR

CROSS REFERENCE TO RELATED APPLICATIONS

This application claims the benefit of U.S. Provisional Application No. 60/555,270, filed Mar. 22, 2004, which is hereby incorporated by reference in its entirety.

TECHNICAL FIELD

This invention relates to a method and apparatus for cooling a hybrid transmission electric motor.

BACKGROUND OF THE INVENTION

The electric motors in a hybrid electro-mechanical transmission generate heat during operation. If the heat is not adequately dissipated, the performance and reliability of the motors may be impaired.

SUMMARY OF THE INVENTION

The present invention is drawn to a method and apparatus for cooling a hybrid transmission electric motor. A generally cylindrical motor housing having first and second engagement surfaces is provided. During assembly, the first and second engagement surfaces of the motor housing engage the transmission housing such that an annular chamber is formed therebetween. Pressurized coolant is disposed in the annular chamber through an access port in the transmission housing, and is thereafter applied to the stator windings of the electric motor through a plurality of coolant apertures in the motor housing. The pressurized coolant is preferably transmission fluid so that an additional coolant reservoir is not required.

According to a preferred embodiment, the first and second engagement surfaces each include an O-ring adapted to seal the annular cavity. A drain is disposed in the motor housing to prevent excess accumulation of coolant. The drain may be located at a height adapted to maintain a steady state level of accumulated coolant within the motor housing such that the electric motor is both cooled by the initial application of pressurized coolant and also by the accumulated coolant within the housing. A housing cover is preferably attached to the motor housing to enclose the electric motor and retain the accumulated coolant.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
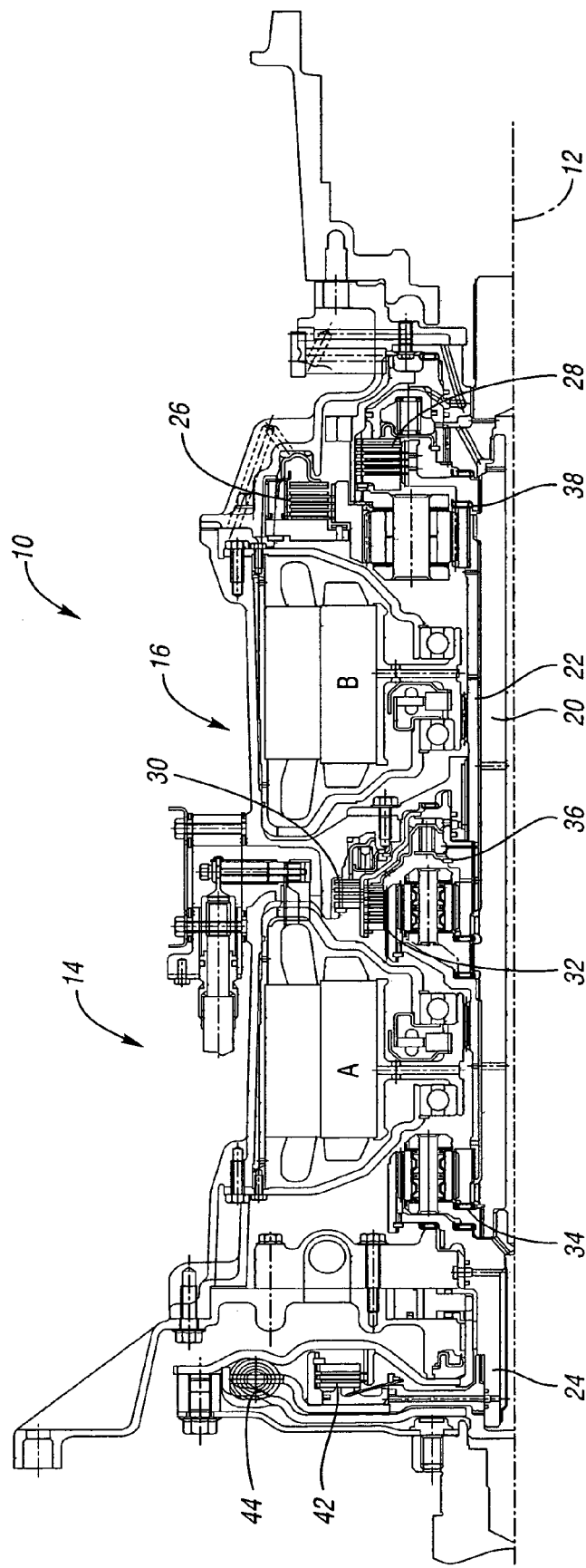
FIG. 1 is a schematic fragmentary cross-sectional view of a hybrid electro-mechanical transmission.

Referring to the drawings, wherein like reference numbers refer to like components, FIG. 1 shows the upper half of a transmission 10, in cross sectional view. The lower half of the transmission (not shown) is disposed on the opposite side of center axis 12. First and second electric motor modules 14, 16, respectively, are disposed about the center axis 12 within the transmission 10. A main shaft 20 is longitudinally disposed, rotatable about the center axis 12. A plurality of inner shafts, such as inner shaft 22, are concentrically disposed about the main shaft 20, and are likewise rotatable about the center axis. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member (not shown). As will be readily understood by those skilled in the art, each of the planetary gear sets includes a sun gear member, a planet carrier assembly member and a ring gear member. A fifth clutch, referred to as a lockout clutch 42, is operable for locking out torsion isolator 44 (also referred to as damper springs) from surrounding structural elements, and to provide a direct connection between the engine and transmission.

Figure 2:
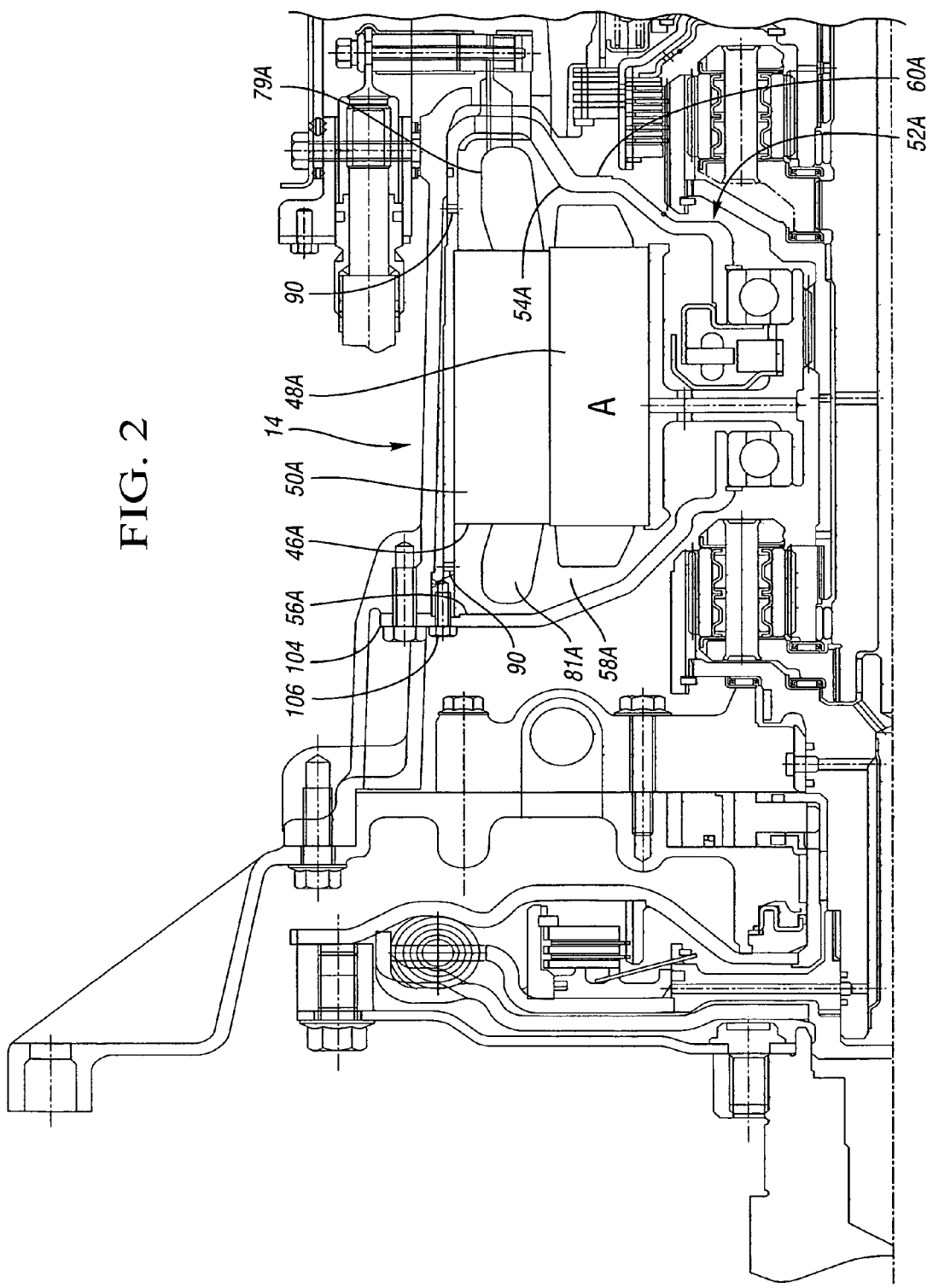
FIG. 2 is a schematic fragmentary cross-sectional view of a frontward portion of the transmission of FIG. 1.
Figure 3:
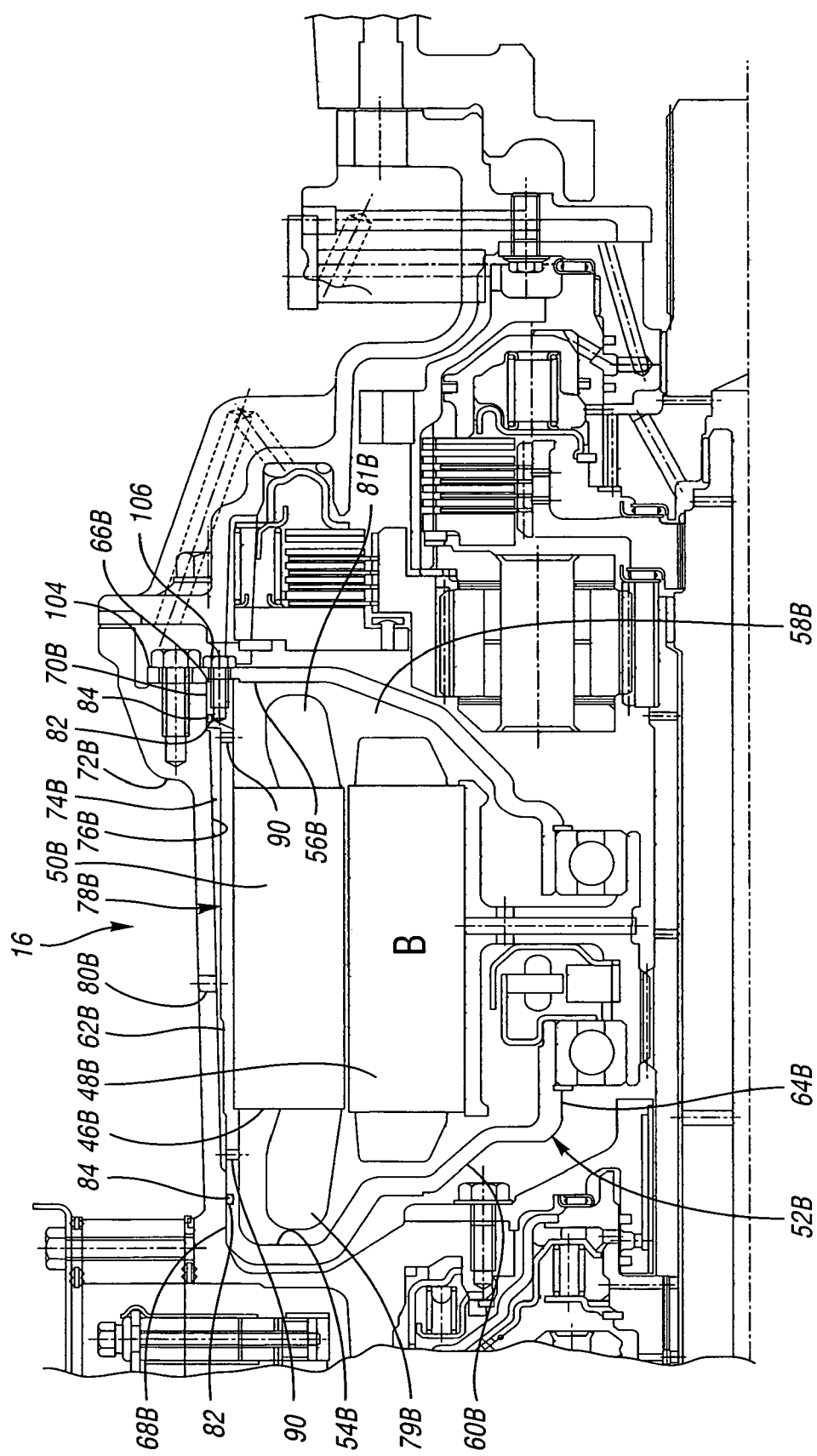
FIG. 3 is a schematic fragmentary cross-sectional view of a rearward portion of the transmission of FIG. 1.

As shown in FIGS. 2 and 3, the first and second motor modules 14, 16 are self-contained assemblies. The motor modules 14, 16 each include a motor 46A, 46B, respectively. The motors 46A, 46B each include a rotor 48A, 48B and a stator 50A, 50B, respectively. The stator 50A includes stator windings 79A and 81A, and similarly the stator 50B includes stator windings 79B and 81B. It should be appreciated by one skilled in the art that the stator windings 79A, 81A, 79B and 81B generate heat during operation and therefore may be cooled to ensure optimal performance and reliability of the motors 46A, 46B.

The motors 46A, 46B are preferably enclosed within a drum 52A, 52B comprised of a generally cylindrical module housing 54A, 54B and a module housing cover 56A, 56B. Each module housing 54A, 54B includes an open end 58A, 58B adapted to facilitate the insertion of a motor, and an enclosed end 60A, 60B. The module housing covers 56A, 56B are respectively attached to the open end 58A, 58B of the module housing 54A, 54B after the motors 46A, 46B have been inserted therein as will be described in detail hereinafter. According to a preferred embodiment, the housing 54A, 54B is composed of formed steel and the cover 56A, 56B is stamped steel; however, it should be appreciated that the housing and cover may be composed of alternate materials and/or fabricated according to other known manufacturing processes.

Referring to FIG. 3, the housing 54B defines an outer surface 62B and an inner surface 64B. The outer surface 62B is generally linear with a raised portion 66B near the open end 58B of the housing 54B. A first engagement surface 68B adapted to engage the transmission housing 72B is located near the enclosed end 60B of the housing 54B, and a second engagement surface 70B adapted to engage the transmission housing 72B is located on the raised portion 66B of the outer surface 62B. The portion of the outer surface 62B between the first and second engagement surfaces is not in contact with the transmission housing 72B and, as will be described in detail hereinafter, partially defines the annular cavity 74B. To manufacture the housing 54B using the preferred forming process, it may be necessary to machine the engagement surfaces 68B, 70B in order to maintain desired tolerances necessary for properly fitting the module housing 54B within the transmission 10. Advantageously, this embodiment provides a precision fit between the housing 54B and the transmission 10 without the expense required to machine the entire outer surface 62B.

The transmission housing 72B includes a surface 76B defining a motor cavity 78B adapted to accommodate the module housing 54B. The cavity surface 76B preferably includes a draft angle of approximately 3 degrees to facilitate installation of the module housing 54B. During installation, the first and second engagement surfaces 68B, 70B of the module housing 54B engage the cavity surface 76B such that the area axially defined between the first and second engagement surfaces 68B, 70B, and radially defined between the outer surface 62B of the module housing 54B and the cavity surface 76B of the transmission housing 72B, forms the annular cavity 74B. Coolant 100 (shown in FIG. 5) is introduced into the annular cavity 74B through an access port 80B in the transmission housing 72B. The coolant 100 is preferably pressurized to facilitate the application thereof onto the motor 46B; however, the coolant 100 may alternatively be applied using gravitational forces. The coolant 100 is preferably fluid from the transmission's cooling system (not shown) used to cool other transmission components; however, it should be appreciated that other fluids may be envisioned for this purpose. The implementation of fluid from the transmission cooling system is particularly advantageous because it does not require additional parts for storing, pressurizing and transferring a separate fluid source.

The first and second engagement surfaces 68B, 70B of the module housing 54B each define an O-ring groove 82 having an O-ring 84 disposed therein. The O-rings 84 are adapted to seal the annular cavity 74B and prevent leakage of the coolant 100 (shown in FIG. 5). The O-rings 84 also aid in piloting and centering the module 16 into the transmission housing 72B prior to attachment. The motor module 14 of FIGS. 1 and 2 has structural characteristics similar to those described hereinabove for the motor module 16.

Figure 4:
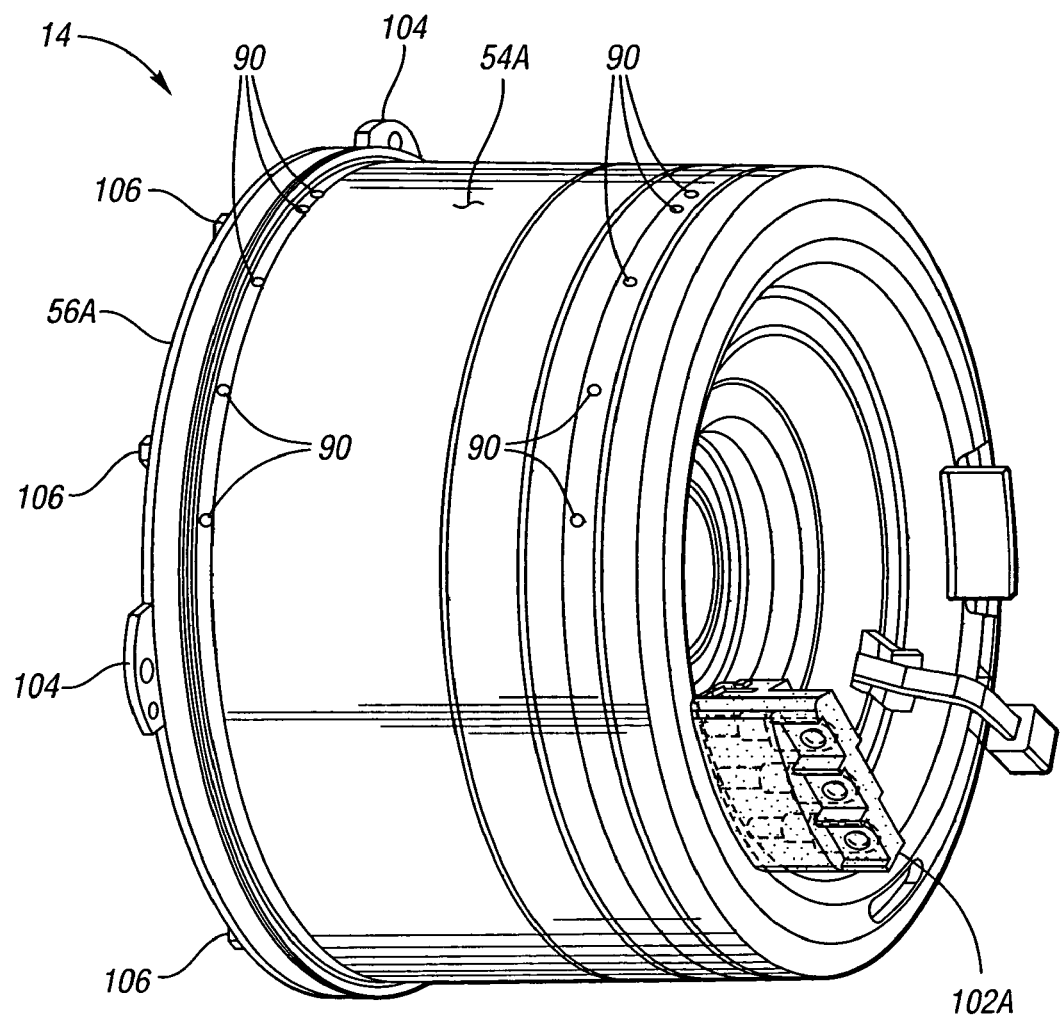
FIG. 4 is a schematic perspective view of a housing and attached cover for a motor module used in the transmission of FIG. 1.

Referring to FIGS. 2 and 4, a plurality of coolant apertures 90 in fluid communication with the annular cavity 74A are disposed about the perimeter of the module housing 54A. The pressurized coolant 100 (shown in FIG. 5) in the annular cavity 74A will spray out of the coolant apertures 90 at a rate defined by the amount of pressure in the annular cavity 74A, as well as the size, shape, and number of coolant apertures 90. According to a preferred embodiment, a first plurality of coolant apertures 90 are disposed about the perimeter of the module housing 54A in alignment with stator windings 79A, and a second plurality of coolant apertures 90 are disposed about the perimeter of the module housing 54A in alignment with stator windings 81A such that the pressurized coolant 100 is applied directly to the stator windings 79A, 81A to cool the motor 46A. It should, however, be appreciated that alternate cooling aperture configurations may be envisioned. Similar cooling structure is provided on the motor module 16 of FIG. 3.

Figure 5:
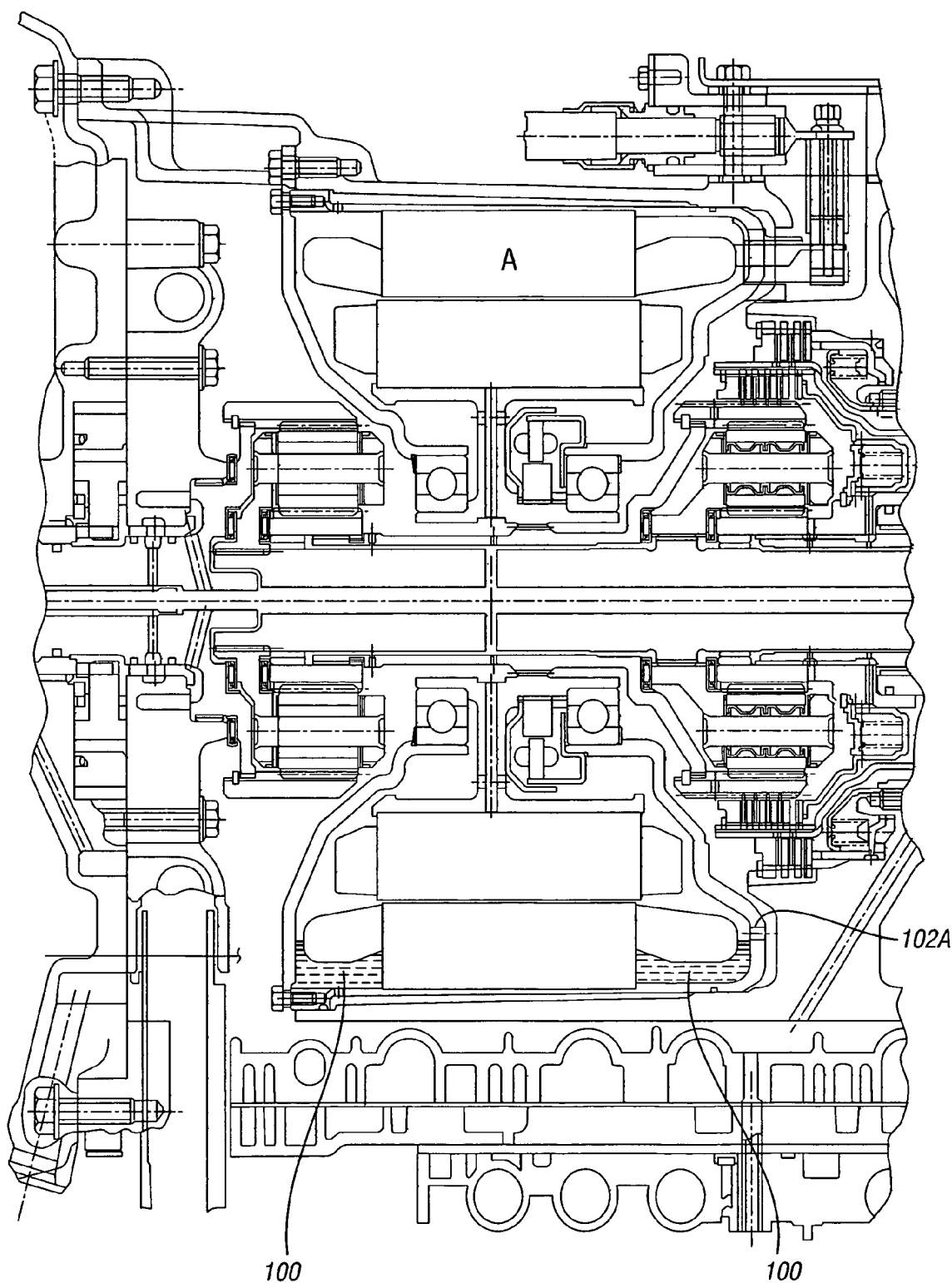
FIG. 5 is a schematic cross-sectional view of a frontward portion of the transmission of FIG. 1.

Referring to FIGS. 4 and 5, the coolant 100 introduced into the housing 54A by the coolant apertures 90 accumulates until the level thereof reaches a drain 102. The steady state level of coolant 100 in the module housing is therefore controllable by the location of the drain 102A. It should be appreciated that in addition to the cooling of the stator windings 79A, 81A by the application of coolant 100 from the apertures 90, the stator windings 79A, 81A are also cooled by the accumulated coolant 100 stored in the housing 54A.

The housing cover 56A is preferably piloted on and bolted to the open end 58A of the module housing 54A with bolts 106 so that the cover 56A is removable if, for example, it becomes necessary to repair the motor 46A. It should be appreciated, however, that the cover 56A may alternatively be attached to the module housing 54A in any conventional manner.

The housing cover 56A preferably includes a plurality of mounting tabs 104 radially spaced about the cover that allow the motor module 14 to be bolted to the transmission main housing 72A. The mounting tabs 104 provide easily accessible attachment and facilitate the absorption of stator torque by the transmission housing 72A. The second motor module 16 of FIGS. 1 and 3 has similar structural characteristics.

While the best modes for carrying out the invention have been described in detail, those familiar with the art to which this invention relates will recognize various alternative designs and embodiments for practicing the invention within the scope of the appended claims.

What is claimed is:

1. A hybrid transmission comprising:
   a transmission housing having a surface defining a motor cavity;
   a motor module disposed in the transmission motor cavity, the motor module including:
   a generally cylindrical module housing defining an outer surface and an inner surface, said module housing having an open end and an enclosed end opposite the open end, said module housing including a plurality of coolant apertures formed therein;
   a motor assembly disposed within said module housing, the motor assembly including:
   a stator; and
   a rotor circumscribed by the stator;
   said outer surface of said module housing and said transmission housing surface defining an annular cavity therebetween, said annular cavity being in fluid communication with said plurality of coolant apertures; and
   wherein coolant in the annular cavity is dispersed through said plurality of coolant apertures onto the stator to cool the motor assembly.

2. The hybrid transmission of claim 1, wherein said outer surface of said module housing includes a first engagement surface and a second engagement surface.

3. The hybrid transmission of claim 1, wherein said outer surface of said module housing includes a plurality of O-rings adapted to seal said annular cavity.

4. The hybrid transmission of claim 1, wherein said module housing includes a drain configured to release the coolant that accumulates within said module housing.

5. The hybrid transmission of claim 1, wherein said motor module includes a housing cover attached to said open end of said module housing.

6. The hybrid transmission of claim 1, wherein said transmission housing includes an access port through which the coolant is introduced into the annular cavity.

7. The hybrid transmission of claim 1, wherein the coolant comprises transmission fluid.

8. A hybrid transmission comprising:
   a transmission housing having a surface defining a motor cavity;
   a motor module disposed in the transmission motor cavity, the motor module including:
      a generally cylindrical module housing defining an outer surface and an inner surface, said module housing having an open end and an enclosed end opposite the open end, said module housing including a plurality of coolant apertures;
      a motor assembly disposed within said module housing, the motor assembly including:
         a stator having a plurality of stator windings in alignment with at least one of said plurality of coolant apertures; and
         a rotor circumscribed by the stator; and
      a housing cover attached to the open end of the module housing;
   said outer surface of said module housing and said transmission housing surface defining an annular cavity therebetween, said annular cavity being in fluid communication with said plurality of coolant apertures; and
   wherein pressurized coolant in the annular cavity is dispersed through said plurality of coolant apertures onto the stator windings to cool the motor assembly.

9. The hybrid transmission of claim 8, wherein said outer surface of said module housing includes a first engagement surface and a second engagement surface.

10. The hybrid transmission of claim 8, wherein said outer surface of said module housing includes a plurality of O-rings adapted to seal said annular cavity.

11. The hybrid transmission of claim 8, wherein said module housing includes a drain configured to release the coolant that accumulates within said module housing.

12. The hybrid transmission of claim 8, wherein said transmission housing includes an access port through which the pressurized coolant is introduced into the annular cavity.

13. The hybrid transmission of claim 8, wherein the pressurized coolant comprises transmission fluid.

14. A method for cooling an electric motor in a hybrid transmission, said method comprising:
   providing a motor module including:
      a generally cylindrical module housing defining an outer surface and an inner surface, said module housing having an open end and an enclosed end opposite the open end, said module housing including a plurality of coolant apertures;
      a motor assembly disposed within said module housing, the motor assembly including:
         a stator in alignment with at least one of said plurality of coolant apertures; and
         a rotor circumscribed by the stator; and
      a housing cover attached to the open end of the module housing;
   installing the motor module into a motor cavity of a transmission housing such that an annular cavity is defined between the outer surface of the module housing and the transmission housing; and
   introducing coolant into the annular cavity such that the coolant is dispersed through said plurality of coolant apertures onto the stator to cool the motor assembly.

15. The method of claim 14 further comprising sealing the annular cavity.

16. The method of claim 14 further comprising pressurizing the coolant before it is introduced into the annular cavity.

17. The method of claim 14 further comprising draining excess coolant that accumulates within the module housing.

* * * * *